I. R. KELLER.
RAIN WATER STRAINER AND CUT-OFF.
APPLICATION FILED MAY 16, 1916.
1,242,814.
Patented Oct. 9, 1917.
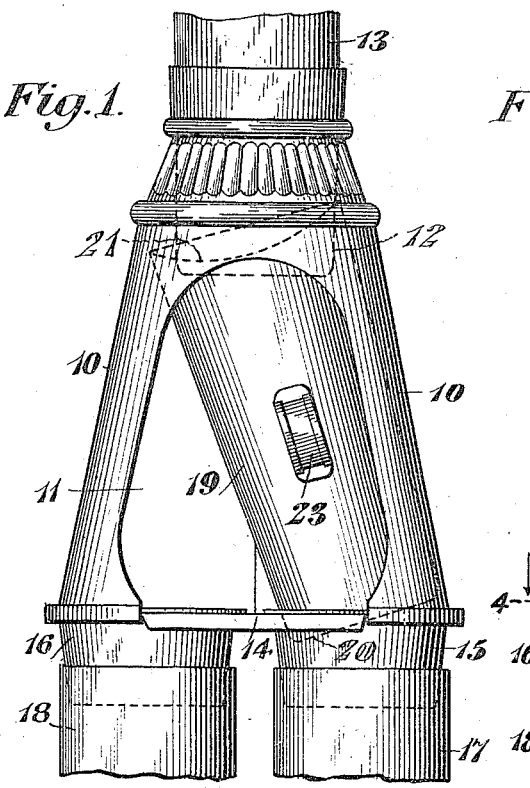
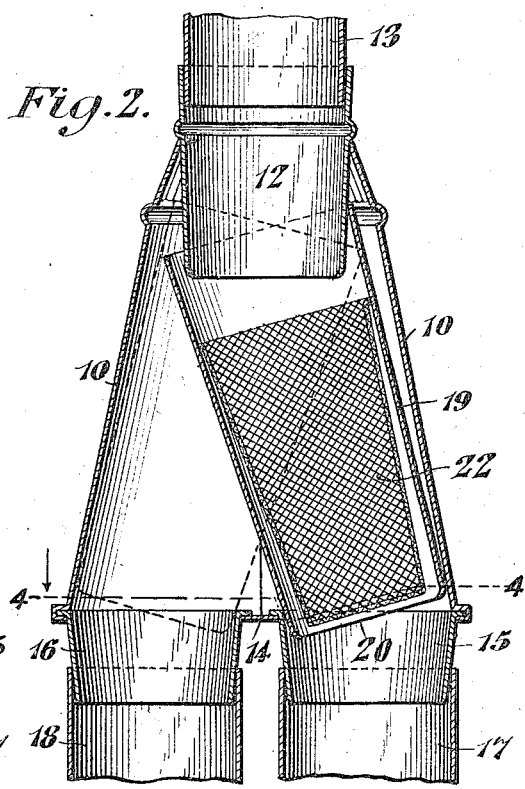
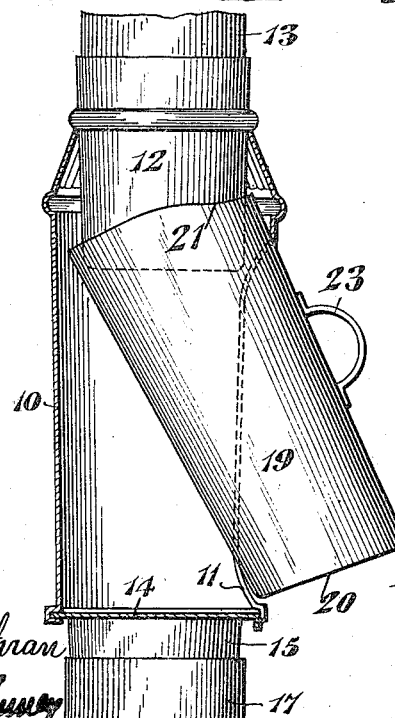
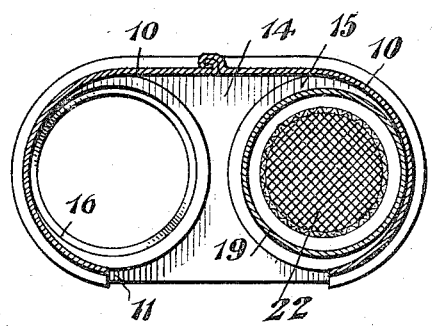
I. R. Keller, INVENTOR
WITNESSES
ATTORNEY

UNITED STATES PATENT OFFICE.

ISIDORE R. KELLER, OF UPPER SANDUSKY, OHIO.

RAIN-WATER STRAINER AND CUT-OFF.

1,242,814.  Specification of Letters Patent.  Patented Oct. 9, 1917.

Application filed May 16, 1916. Serial No. 97,939.

*To all whom it may concern:*

Be it known that I, ISIDORE R. KELLER, a citizen of the United States, residing at Upper Sandusky, in the county of Wyandot and State of Ohio, have invented a new and useful Rain-Water Strainer and Cut-Off, of which the following is a specification.

The present invention relates to an improvement in rain-water strainers and cut-offs, and has for an object to provide a device of this character with a detachable shiftable or switching member so constructed as to provide a strainer for the rain-water as it passes through the device.

Another object of this invention is to provide a cut-off switch or shiftable tube which directs the rain-water through either one of two outlets, and which has a strainer therein to catch leaves, and other rain spout and eaves trough accumulations; and to provide a construction which permits the ready removal of this tube with its strainer, so that the same may be easily and quickly cleansed.

A further object of the invention is to provide a rain-water cut-off and strainer which has no pivots, bearings, levers, or the like, which are liable to rust out and become inoperative; and which has an open casing and a single removable member in the casing adapted to be shifted or removed, as desired, to change the direction of the rain-water flow, or to remove the member for cleansing purposes.

Other objects and advantages of this invention will be brought out in the following specific disclosure of the preferred embodiment, the same being illustrated in the accompanying drawing, wherein—

Figure 1 is a front elevation of the device showing the shiftable tube adjusted to direct the rain-water into the right hand outlet.

Fig. 2 is a vertical central section taken through the same, the dotted lines showing the tube shifted to direct the rain-water into the left hand outlet.

Fig. 3 is a transverse sectional view, taken centrally through the casing, showing the shiftable tube swung outwardly at its lower end ready for detachment from the casing.

Fig. 4 is a horizontal section taken on the line 4—4 of Fig. 2, showing the lower end of the shiftable tube fitting in the right hand outlet of the casing.

Referring to this drawing, 10 designates a casing which is flat on the inside, having an open front 11, and which has its sides converging upwardly to the top of the casing. An inlet nipple 12 extends downwardly through the top of the casing 10 a sufficient distance to clear the lower end of the nipple from the sides of the casing. The upper end of the nipple, which protrudes from the casing, is adapted to receive therein the lower extremity of a rain spout 13. The nipple is preferably soldered in place.

The bottom 14 of the casing is flat and has near its opposite ends openings through which project downwardly tapering outlet nipples 15 and 16. These nipples 15 and 16 have outturned flanges at their upper ends which seat upon and are soldered or otherwise suitably secured to the upper face of the bottom 14 to support the nipples 15 and 16 in place. The sides of the casing 10 are rounded, and the ends of the bottom 14 are rounded to conform to the contour of the outer sides of the nipples 15 and 16, as clearly shown in Fig. 4. The nipples 15 and 16 are adapted to fit into the upper ends of the pipes 17 and 18 which may lead to a cistern and a discharge, or to any other desirable points for carrying off the rain-water passing through the casing 10.

A tapered shiftable member or tube 19 is detachably positioned in the casing 10. This tube 19 has the large end at the top to fit loosely over the lower end of the inlet nipple 12 to admit of the swinging of the lower end of the tube 19 laterally in the casing 10 and forwardly through the open front 11 thereof. The lower end of the tube 19 is adapted to project into either one of the outlet nipples 15 or 16 and to bind therein, so as to hold the shiftable tube 19 in communication with either one of these outlet nipples.

The shiftable tube 19 preferably has its lower edge 20 beveled from its forward side rearwardly, as clearly shown in Fig. 3, to provide ample clearance between the bottom 14 of the casing and the lower end of the tube 19, when the latter is being withdrawn from or introduced into the casing 10. To further assist this removal and positioning of the tube 19, the upper edge of the tube at the front thereof is depressed or cut away as at 21 to permit the swinging outwardly of the tube 19 about the lower end of the inlet nipple 12 to a considerable extent, as shown clearly in Fig. 3.

Within the shiftable tube 19 is placed a strainer 22, the same extending for a considerable distance throughout the length of the tube 19 and having its open end facing the upper end of the tube and secured to the inner wall thereof as shown in Fig. 2. The strainer 22 tapers downwardly and is of reduced diameter as compared with that of the interior of the tube, so as to provide an annular space about the strainer 22 throughout substantially its entire length. This construction and arrangement of the strainer 22 provides a perforated cup in the tube 19, the latter in turn constituting a removable cup-like structure, which strainer presents a relatively large filtering or straining area, and which admits of the passage of water through the strainer even though the bottom thereof be clogged or filled with accumulations from the rain spout 13.

The lower end of the inlet nipple 12, and the lower end of the shiftable tube 19, are each provided with an annular slightly inturned flange to permit the easy and quick engagement of the upper end of the tube 19 over the nipple 12, and the fitting of the lower end of the tube 19 in either one of the outlet nipples 15 or 16. The front or outer side of the shiftable tube 19 is provided with a handle 23, preferably of the strap type, as shown, to receive the finger for lifting and shifting the tube 19.

When the device is adjusted into the position shown in Figs. 1, 2 and 4, of the drawings, the rain-water passes downwardly through the spout 13 into the nipple 12, and from the nipple 12 into the shiftable tube 19. The water in the tube 19 passes through the strainer 22 and all leaves and other accumulations in the rain-water are retained and collected in the strainer 22. The water passes through the bottom and sides of the strainer 22 and through the lower end of the tube 19 into the outlet nipple 15, the water passing through the pipe 17 to the cistern, or other suitable point of discharge.

When it is desired to direct the water into the outlet nipple 16 and the pipe 18, the handle 23 is grasped, and the tube 19 is raised until its lower end clears the nipple 15. This movement causes the upper end of the tube 19 to slide upwardly about the nipple 12, the nipple holding the upper end of the tube in communication therewith. The tube 19 is now swung from the right hand side of the casing 10 into the left hand side thereof, so as to register over the nipple 16. Downward movement of the tube 19 causes the lower end thereof to fit into the upper end of the nipple 16. From Figs. 2 and 4, it will be observed that the side of the tube 19 fits snugly against the rounded side of the casing 10, the side of the casing and the inner side of the outlet nipple holding the lower end of the tube 19 in wedging relation in the upper end of the nipple.

When it is desired to clean out the strainer 22, it is only necessary to grasp the handle 23, lift the tube 19 out of the outlet nipple, and swing the lower end of the tube into vertical alinement beneath the inlet nipple 12. The tube 19 is now raised upwardly into the position shown in Fig. 3, and its lower end is swung outwardly clear of the bottom 14, and the tube is then drawn downwardly away from the inlet nipple 12 and out of the casing 10. This shiftable tube 19 may now be overturned to dump the contents of the screen 22 out of the tube. Accumulations which adhere to the screen may be easily removed by running water through the inverted tube.

This simply constructed device admits of the adjustment of the tube to direct the water into either one of the outlets, and admits the quick and easy removal of the tube to cleanse the same. It will also be noted that this shiftable member carries therein the screen, or strainer for collecting the accumulations in the rain-water.

The device may be economically manufactured from sheet metal, such as tin, as the body portion of the casing 10 may be made of a single sheet of metal stamped intermediate its ends to provide the open front 11 and having its edges meeting at the rear of the casing, as shown in Fig. 4, and overturned and soldered. The lower end of the casing 10 may be flanged about the marginal edge of the bottom 14 to hold the latter in place. The nipple 12 may be provided with an annular bead near its upper end to seat upon the upper edge of the casing 10 to hold the nipple in place.

The casing 10 is of a depth but slightly greater than the diameter of the tube 19, and when the tube is fitted in either side of the casing the handle 23, on the front side of the tube, projects outwardly to a sufficient extent to be grasped in the hand for adjusting and removing the tube.

It is, of course, understood that the device of this invention may be of different specific constructions and that these variations or modifications are restricted only by the scope of the following claims.

What is claimed is:—

1. In a device of the character described, a casing, an inlet nipple projecting downwardly into said casing, outlet nipples communicating with the bottom of the casing and arranged symmetrically at each side of the axis of said inlet nipple, a removable connecting tube loosely encircling at one end the lower end of said inlet nipple and movable longitudinally thereof, the lower end of said tube being adapted to be swung from a position over one outlet nipple to a position over the other around the lower end of said inlet nipple as an axis, the front of said casing being provided with an opening through which the lower end of said tube may be swung around a horizontal axis passing through the lower end of the inlet nipple to permit the removal of the tube from the casing, the connection between the upper end of said tube and the lower end of said inlet nipple being sufficiently loose to allow such movement of the tube through the opening, and a strainer mounted within said tube.

2. In a device of the character described, a casing, an inlet nipple at the upper end of said casing, outlet nipples communicating with the bottom of said casing and arranged symmetrically upon the opposite sides of the axis of said inlet nipple, a removable connecting tube having one end loosely encircling the lower end of the inlet tube and its opposite end projecting into and supported by either of said outlet nipples, said tube being movable longitudinally of said inlet nipple, and also swingable around horizontal axes arranged at right angles to each other and passing through the lower end of said inlet nipple whereby the tube may be moved longitudinally to disengage the lower end thereof from one outlet nipple and swung laterally to be engaged with the other outlet nipple or swung around an axis at right angles and disengaged from said inlet nipple by a slight longitudinal movement downwardly to permit its removal from the casing, and a strainer mounted within said tube.

3. In a device of the character described, a casing, an inlet nipple having an end projecting into the casing through the top thereof, a pair of outlet nipples communicating with said casing through the bottom, a removable connecting tube having an upper end loosely encircling the inlet nipple and a lower end projecting into and engaging either of said outlet nipples, said tube being movable longitudinally to disengage said lower end from either of the lower nipples and swingable around a horizontal axis located adjacent the lower end of said inlet nipple, whereby the lower end of the tube may be engaged with either nipple, said tube also being swingable around a horizontal axis located adjacent the lower end of said upper nipple and arranged at right angles to said first-mentioned horizontal axis whereby the tube may be swung in a direction at right angles thereto, said casing being provided with an opening through which the lower end of said tube may be swung around the last-mentioned axis, said tube being then disengageable from the upper nipple by a longitudinal movement, and a strainer within said tube.

4. In a device of the character described, a casing, an inlet nipple projecting inwardly through the top of said casing, a pair of outlet nipples communicating with said casing through the bottom thereof, a removable connecting tube within said casing having an upper end loosely encircling the end of said inlet nipple and swingable around said end on an axis extending at right angles to the axis of the inlet nipple and movable longitudinally thereof, the lower end of said tube being adapted to engage and rest upon either of said outlet nipples, said casing being provided with an opening through the side thereof of a length sufficient to allow the lower end of the tube to be swung therethrough, disengaged from the inlet nipple and removed, and a strainer within said tube.

5. In a device of the character described, a downwardly diverging casing, an inlet nipple projecting inwardly into the casing at the upper end thereof, a pair of outlet nipples communicating with said casing through the bottom at opposite sides thereof, a removable connecting tube encircling at its upper end the lower end of the inlet nipple, the opposite end of said tube projecting into either of said outlet nipples, supported thereby and engaging at one side with the wall of said nipple and at the opposite side with the wall of said casing, said tube being movable longitudinally to be disengaged from either outlet nipple or from said inlet nipple, the lower end of said tube being movable around horizontal axes passing through the lower end of said inlet nipple, said casing being provided with an opening through the side thereof of a length sufficient to allow the passage of the lower end of said tube therethrough whereby a slight longitudinal movement will be sufficient to disengage said tube from the inlet nipple to permit its removal from the casing, and a strainer mounted within said tube.

6. In a device of the character described, a downwardly diverging casing, an inlet nipple projecting centrally through the top of said casing into the same, a pair of outlet nipples communicating with said casing through the bottom thereof at opposite sides thereof, the outer portions of said nipples being substantially in alinement with the adjacent walls of the casing, the bottom of said casing being unobstructed, a removable frusto-conical tube of a length sufficient to loosely encircle the inlet nipple at one end and to project into either outlet nipple at its opposite end and be supported at diametrically opposite points by the casing and the inside of the nipple whereby it is retained in position, said tube being movable longitudinally to disengage the inlet nipple or either outlet nipple and swingable around horizontal axes lying adjacent the lower end of said inlet nipple, said casing being provided with an opening through which the lower end of said tube may be swung whereby it can be disengaged from said inlet nipple and removed, and a strainer mounted within said frusto-conical tube.

In testimony that I claim the foregoing as my own, I have hereto affixed my signature in the presence of two witnesses.

ISIDORE R. KELLER.

Witnesses:
WM. FLECK,
A. E. WALTON.

Copies of this patent may be obtained for five cents each, by addressing the "Commissioner of Patents, Washington, D. C."